(No Model.)
H. H. TURNER.
PHOTOGRAPHIC SHUTTER.
No. 520,198. Patented May 22, 1894.
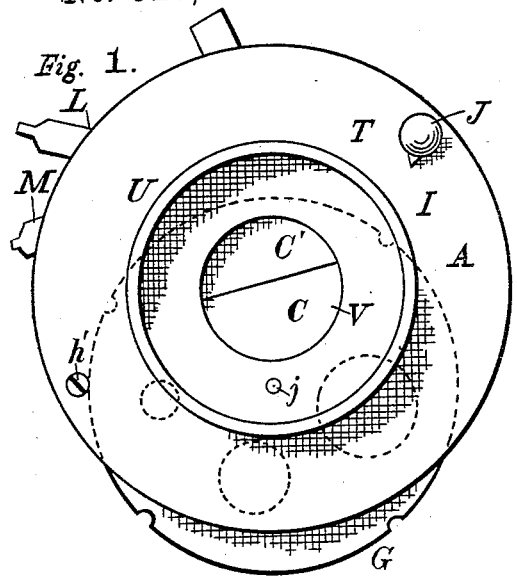
Fig. 1.
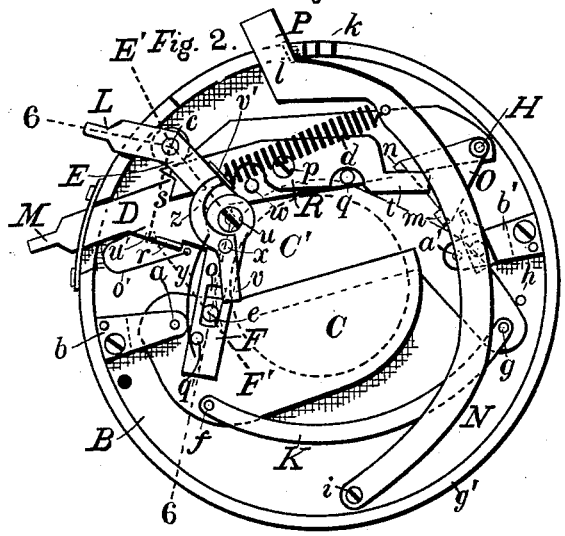
Fig. 2.
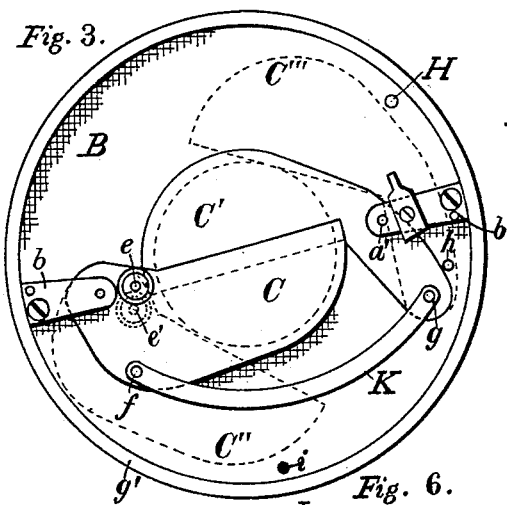
Fig. 3.
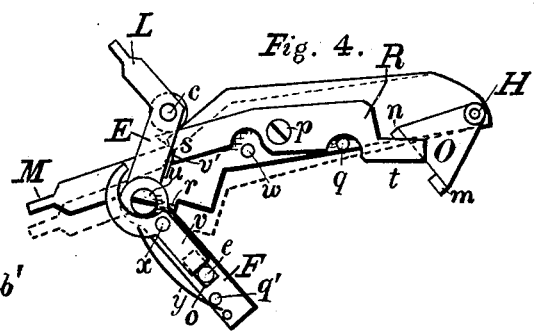
Fig. 4.
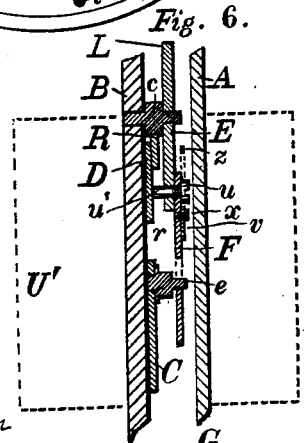
Fig. 6.
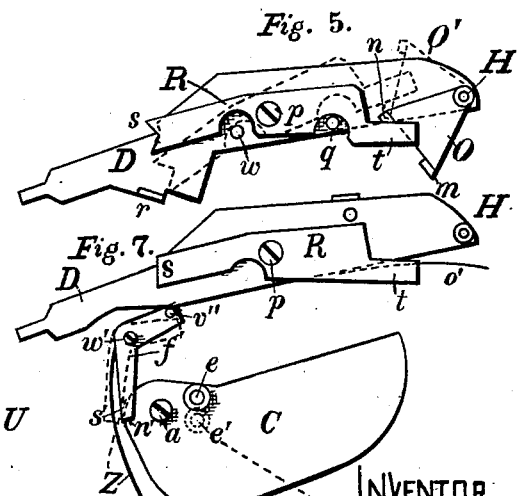
Fig. 5.
Fig. 7.
WITNESSES
D. E. Eaton
C. G. Cranwell
INVENTOR
H. H. Turner,
By Geo. B. Selden,
atty.

UNITED STATES PATENT OFFICE.

HENRY H. TURNER, OF ROCHESTER, NEW YORK, ASSIGNOR TO THE GUNDLACH OPTICAL COMPANY, OF SAME PLACE.

PHOTOGRAPHIC SHUTTER.

SPECIFICATION forming part of Letters Patent No. 520,198, dated May 22, 1894.

Application filed February 15, 1894. Serial No. 500,233. (No model.)

*To all whom it may concern:*

Be it known that I, HENRY H. TURNER, a citizen of the United States, residing at Rochester, New York, have invented certain Improvements in Shutters for Photographic Cameras, of which the following is a specification, reference being had to the accompanying drawings.

My invention relates to certain improvements in the construction of shutters for photographic-cameras,—which improvements are fully described and illustrated in the following specification and the accompanying drawings,—the novel features thereof being specified in the claims annexed to the said specification.

In the accompanying drawings representing my improved shutter, Figure 1 is a front elevation. Fig. 2 is a front view of the operative parts,—the front plate being removed. Fig. 3 is a front view of the support and the vibrating exposing wings. Fig. 4 represents the toggle-levers and the release lever detached. Fig. 5 represents the release lever and the secondary time exposure lever. Fig. 6 is a section on the line 6—6, Fig. 2. Fig. 7 represents the safety-catch arrangement.

My improved shutter is designed to be employed on photographic cameras, in front of or behind the lens, or, as represented in the accompanying drawings, as a part of the lens mounting.

It consists essentially of a suitable support B, a vibrating exposing wing C, or wings C C', an operating spring $d$, and a pair of toggle levers E F,—one of which is pivoted to the support, while the other is so connected to one of the wings that the requisite vibrating motion is imparted to it while the toggle-levers swing in one direction, but the wing remains at rest during the return motion of the levers,—during which motion the spring is set for the next exposure.

My invention also comprises a trip or releasing lever, a supplementary lever for making time exposures, a pivoted safety catch engaging the wing and holding it closed, means for regulating the tension of the operating spring, and consequently the length of the exposure, and various other features, all as hereinafter more fully described. The position of the toggle-levers E F, when the shutter is set ready for an exposure is shown in Fig. 4, while the position they occupy after an exposure is represented in Fig. 2.

L is the arm or lever by which the shutter is set, and M is the projecting part of the release lever D, by the movement of which the exposure is effected. The operating spring $d$ is attached to one of the toggle levers, and tends constantly to draw them from left to right in the arrangement shown,—the tension of the spring depending upon the position of the lever N to which it is fastened at one end.

The support B is made in any suitable or preferred manner, adapted to sustain the operating parts of the shutter, and it may be located in front of or behind the lens, or on the camera front, or preferably, as represented in the accompanying drawings, as a part of the lens tube U', Fig. 6. A plate A is arranged at a suitable distance from the support B,—the operative parts of the shutter being included between these two parts,—and the plate A, in case the shutter is placed in the lens, being provided with the tube U, Figs. 1 and 6. The support B is provided with the projecting flange $g'$ around its edges,—suitable notches being made in this flange to permit the movements of the setting lever L, the end M of the release lever D, and the end P of the spring tension-adjusting lever N. The support B and the plate A are secured together in any suitable way,—such for instance as by the pivot H of the release lever, and the screw $h'$. Steadying pins may also be employed if desired. The plate A may be provided with the usual revolving diaphragm G, pivoted at $j$, Fig. 1.

In Fig. 3 I have represented the rear section and the vibrating exposing wings C C'. These wings are pivoted to the support at $a$ $a'$ respectively,—their vibrating movements in making the exposure being represented by the dotted lines C'' C'''. The inner edges of the wings lap over each other across the exposure opening V, so as to effectually exclude the light when the shutter is closed. The pivots $a$ $a'$ preferably turn with the wings, their forward ends being supported by the arms $b$ $b'$, which are fastened to the support and project inward over the wings. The wings are connected together so as to vibrate simultaneously by the link K, pivoted to the wings on the pins $f$ and $g$ respectively. It will however be understood that a single wing may be used, if preferred,—its movement being made sufficient to open the exposure orifice V. One of the wings is provided with a projecting stud $e$, which during the vibration of the wing travels from $e$ to $e'$ Fig. 3, and back again. This reciprocating movement is secured by the motion of the toggle-levers E and F, which under the pull of the spring $d$, swing from the position shown in Fig. 4, to that shown in Fig. 2,—this motion forcing the stud downward and opening the wing and then drawing it up and closing the wing. The toggle-lever E is pivoted to the support at $c$. The toggle-levers E and F are pivoted together at $u$, and the lever F engages with the stud $e$, so that, as the levers approach the position in which the points $e$, $u$ and $c$ are in the same straight line, the stud $e$ is forced away from $c$, and as the levers recede from such line, the stud $e$ is drawn back again toward $c$. This movement of the stud opens and closes the wings. The position of the center lines of the levers, when the shutter is set ready for an exposure, as in Fig. 4, is indicated by the dotted line $E'$ $F'$ in Fig. 2. The lever E is pivoted on the stud $c$ inserted in the support, and it is provided with the projecting thumb-piece L by which the shutter is set for an exposure. The lever E has a lug or projecting arm $v'$ to which the spring $d$ is attached. The levers E and F are pivoted together at their inner ends in any suitable way,—as for instance by the screw-stud $u$. The release lever D is pivoted on the stud H, so as to swing to and fro a short distance, as indicated by the full and dotted lines in Fig. 4,—it being provided with a lug or catch $r$ with which a pin or lug on one of the toggle-levers engages, for the purpose of holding the shutter set for an exposure, until the release is effected by pressure on the outer end M of the lever. In the construction shown, the screw stud $u$ is prolonged, as at $u'$, Fig. 6, so that it may engage with the lug $r$. The stud $u'$, is flattened on the side which bears against the lug $r$. As the stud $u$ moves from right to left, Fig. 2, while the shutter is being set, its inner end $u'$ comes in contact with the inclined surface of the lug $r$, and presses the lever D downward, until the stud passes beyond the lug, when the spring $o'$ raises the lever and the lug engages behind the stud, in which position the parts are held, as represented in Fig. 4, until the exposure is made by pushing the thumb piece M downward and disengaging the stud $u'$ from the lug $r$, when the spring $d$ will draw the toggle-levers toward the right, thereby vibrating the wings, and permitting the light to pass through the lens for a short interval of time. The spring $o'$ is arranged in any suitable manner,—one end being fastened to the support, and the other secured to the release-lever D.

In order to prevent the toggle-levers from moving the wings during the setting of the shutter, the lever F is provided with a slot $o$ through which the stud $e$ projects, and a pivoted latch $v$, actuated by a spring $y$, and arranged to bear on the stud during the exposing movement, but permitting the stud to travel in the slot while the shutter is being set. This arrangement secures safety in the shutter and prevents the exposure of a plate at the time of setting the shutter. The latch $v$ is pivoted to the lever F at $x$. It is provided with a spring which urges it constantly from right to left in the construction shown. Such spring may be arranged in any convenient way, such for instance as indicated at $y$, which represents a spring attached at one end to the latch and bearing against a pin $q'$ on the arm. The latch is also provided with an arm $z$ which projects beyond the pivot $u$ and bears against a lug on the lever E, or against the arm $v'$. When the levers are moving from right to left, the stud $e$ bears against the side of the latch, and at the extremity of such movement, the stud having passed beyond the end of the latch, the spring $y$ swings the latch toward the left, so that its end bears against the stud, as represented in Fig. 4, in which position it will force the stud downward when the levers move toward the right,—that is, during the first half of the exposure. The continued movement of the levers draws the stud upward again,—the stud bearing against the end of the slot. The arm $z$ renders the movement of the latch positive at the end of the exposing motion of the levers, by coming in contact with the arm $v'$ on the lever E, and insures its disengagement from the stud. The head of the pivot $u$ acts as a stop to limit the movement of the latch under the influence of the spring $y$.

In order to provide for making time-exposure, I attach to the pivoted release-lever D, a movable part or lever, R, which is interposed in the path of the lug $u'$ so as to arrest the toggle-levers in the middle of their movement, holding the wings open until the exposure is ended by a movement of the lever D which releases the lug and permits the levers to close the wings. The time-exposure lever R is pivoted on the release lever D at $p$,—suitable stops $q$ and $w$ may be provided to limit its movement. When the lever R occupies the position shown by the dotted lines in Fig. 5, its end $s$ will be interposed in the path of the pivot $u'$, so that when the pivot escapes from the lug $r$, it is arrested by coming in contact with the end $s$ of the lever R. The parts are so proportioned that at this time, the pivotal points of the toggle-levers occupy the same straight line, so that the stud $e$ is at $e'$, and the shutter consequently open. To stop the time exposure the photographer raises the outer end M of the release-lever D, which operation has the effect of releasing the pivot $u'$ from the end $s$ of the time-exposure lever. This end of the lever is notched, as indicated in the drawings, so that the lever D is held in its depressed position by the engagement of the pivot $u'$ in the notch during the time exposure. When the time exposure lever occupies the position indicated by the full lines in Fig. 5, the pivot $u'$ passes below the lever R, and the exposure will be instantaneous. To shift the lever R from one position to the other, I employ the swinging arm O, having lugs $m$ and $n$, which engage with the end $t$ of the lever. The arm O is attached to a spindle H, which passes through the front plate A, and is provided with a thumb-nut J, Fig. 1, on the outside, and with a pointer or arm which indicates in connection with suitable lettering whether the shutter is set for instantaneous or time exposures. The thumb-nut J is threaded on the spindle H, so that it assists in holding the support and front plate together.

The tension of the operating spring $d$ and consequently the length of snap-exposures is varied by adjusting the position of the lever N, which is pivoted to the support at $i$, Fig. 2, and provided with a lip $l$ which engages with any one of the series of notches $k$ formed in the flange $g'$. The lever N is bent or curved so as to pass around the exposure opening, and it is provided outside the support with a projecting part P by which it is adjusted to vary the time of the exposure.

In Fig. 7 I have represented a safety catch applied to the wing and arranged to be operated by the release-lever. This construction prevents any accidental movement of the wings, and locks them positively closed except at the time of the exposure. The wing C is provided with a projection, $n'$, with which the lower end $s'$ of the pivoted catch $f'$ engages, so that the wing is locked in its closed position. The catch $f'$ is pivoted to the support at $w'$, and its bent end is provided with a pin or lug $v''$, against which the release-lever D bears. When the lever D is moved downward, the catch $f'$ is swung on its pivot, as represented by the dotted lines, so as to disengage its end $s'$ from the projection $n'$,—thereby releasing the wing and allowing the operating spring to actuate the toggle-levers, thereby producing an exposure. The lug $r$ in this case is left off of the release lever,—the catch $f'$ serving both as a safety device and as a trip to permit the exposure. The construction in other respects remains the same,—the time exposure lever operating the same as already described,—its end $s$ serving to arrest the movement of the toggle levers at its center, by contact with the inner end $u'$ of the pivot between the levers. The catch $f'$ is provided with a spring Z attached to the support by the screw $x'$. When the wing closes, the spring Z engages the catch $f'$ with the projection $n'$, and the wing is thus locked until the release lever is depressed. The wing being held positively, when the spring is set, the latch $v$ engages with the stud $e$, and the shutter remains set until the photographer depresses the release lever and disengages the catch $f'$ from the projection $n'$.

Two parallel springs may be employed instead of the spring $d$ shown.

I claim—

1. In a photographic shutter, the combination with a suitable support, of a vibrating exposing wing provided with a projecting stud, a pair of jointed toggle-levers, one of which is pivoted to the support, the other being engaged with the stud and provided with a movable latch adapted to bear on the stud during its movement in one direction only, and an operating spring applied to one of the toggle levers, substantially as described.

2. In a photographic shutter, the combination with a suitable support, of a vibrating exposing wing provided with a projecting stud, a pair of jointed toggle levers, one of which is pivoted to the support, the other being engaged with the stud and provided with a movable latch adapted to bear on the stud during its movement in one direction only, an operating spring applied to one of the toggle-levers, and a movable trip for releasing the levers, substantially as described.

3. In a photographic shutter, the combination with a suitable support, of a vibrating exposing wing provided with a projecting stud, a pair of jointed toggle-levers, one of which is pivoted to the support, the other being engaged with the stud and provided with a movable latch adapted to bear on the stud during its movement in one direction only, an operating spring applied to one of the toggle levers, and means for varying the tension of the operating spring, substantially as described.

4. In a photographic shutter, the combination with a suitable support, of a vibrating exposing wing provided with a projecting stud, a pair of jointed toggle-levers, one of which is pivoted to the support, the other being engaged with the stud and provided with a movable latch adapted to bear on the stud during its movement in one direction only, an operating spring applied to one of the toggle levers, and the pivoted lever, adapted to engage in a series of notches in the support, substantially as described.

5. In a photographic shutter, the combination with a suitable support, of a vibrating wing provided with a projecting stud, a pair of jointed toggle-levers, one of which is pivoted to the support, the other being engaged with the stud and provided with a movable latch adapted to bear on the stud during its movement in one direction only, an operating spring applied to one of the toggle-levers, and a pivoted release-lever adapted to engage with the pivot of the toggle-levers, substantially as described.

6. In a photographic shutter, the combination with a suitable support, of a vibrating wing provided with a projecting stud, a pair of jointed toggle-levers, one of which is pivoted to the support, the other being engaged with the stud and provided with a movable latch adapted to bear on the stud during its movement in one direction only, an operating spring applied to one of the toggle-levers, and a pivoted release-lever adapted to engage with the pivot of the toggle-levers, and carrying the pivoted secondary release lever, arranged for time exposures, substantially as described.

7. In a photographic shutter, the combination with a suitable support of a vibrating wing provided with a projecting stud, a pair of jointed toggle-levers, one of which is pivoted to the support, the other being engaged with the stud and provided with a movable latch adapted to bear on the stud during its movement in one direction only, an operating spring applied to one of the toggle-levers, and a pivoted release-lever adapted to engage with the pivot of the toggle-levers, and carrying the pivoted secondary release lever, arranged for time-exposures, and the movable arm pivoted to the support and adapted to operate the secondary release lever, substantially as described.

8. In a photographic shutter, the combination with a suitable support, of a vibrating exposing wing provided with a projecting stud, a pair of jointed toggle-levers, one of which is pivoted to the support, the other being engaged with the stud and provided with a movable latch adapted to bear on the stud during its movement in one direction only, an operating spring applied to one of the toggle-levers and the movable catch engaging with the wing, substantially as described.

9. In a photographic shutter, the combination with a suitable support, of a vibrating exposing wing provided with a projecting stud, a pair of jointed toggle-levers, one of which is pivoted to the support, the other being engaged with the stud and provided with a movable latch adapted to bear on the stud during its movement in one direction only, the pivoted release lever carrying the secondary time exposure lever adapted to engage with the pivot of the toggle-levers, and the movable catch engaging with the wing, substantially as described.

10. In a photographic shutter, the combination with the support B, of the pivoted exposing wing C, provided with stud $e$, the toggle-lever E pivoted to the support, the slotted toggle-lever F, having latch $v$, the pivot $u$ of the toggle-levers, the operating spring $d$ and a suitable release lever, substantially as described.

11. In a photographic shutter, the combination with the support B, of the pivoted exposing wing C, provided with stud $e$, the toggle-lever E pivoted to the support, the slotted toggle lever F, having latch $v$, the pivot $u$ of the toggle-levers, the operating spring $d$, a suitable release lever, and the pivoted catch $f'$ engaging with the wing, substantially as described.

12. In a photographic-shutter, the combination with a suitable support, of the pivoted wing C having stud $e$, the toggle-lever E having arm $v'$, the slotted toggle-lever F, having latch $v$ provided with arm $z$ pivoted thereon, the spring $y$, the operating spring and the release-lever, substantially as described.

13. In a photographic shutter, the combination with a suitable support, of the pivoted wing C, having stud $e$, the toggle-levers E and F, the latter being slotted and provided with the latch $v$ and spring $y$, the operating spring and the release lever, substantially as described.

14. In a photographic shutter, the combination of the support, the pivoted wing C, having stud $e$, the toggle-levers E and F, the latter being slotted and provided with the latch $v$ and spring $y$, the lug $u'$, the pivoted release-lever D having inclined lug $r$, and the operating spring, substantially as described.

15. In a photographic-shutter, the combination of the support, the pivoted wing C, having stud $e$, the toggle-levers E and F, the latter being slotted and provided with the latch $v$ and spring $y$, the lug $u'$, the pivoted release-lever D, having inclined lug $r$, and carrying the movable time-exposure lever R, substantially as described.

16. In a photographic-shutter, the combination of the support, the pivoted wing C, having stud $e$, the toggle-levers E and F, the latter being slotted and provided with the latch $v$ and spring $y$, the lug $u'$, the pivoted release-lever D, having inclined lug $r$, and carrying the pivoted time-exposure R, and the movable arm O, substantially as described.

HENRY H. TURNER.

Witnesses:
  GEO. B. SELDEN,
  C. G. CRANNELL.